July 12, 1960
J. H. LE BUS
2,944,791
SAMPLE TAKING APPARATUS
Filed Feb. 7, 1956
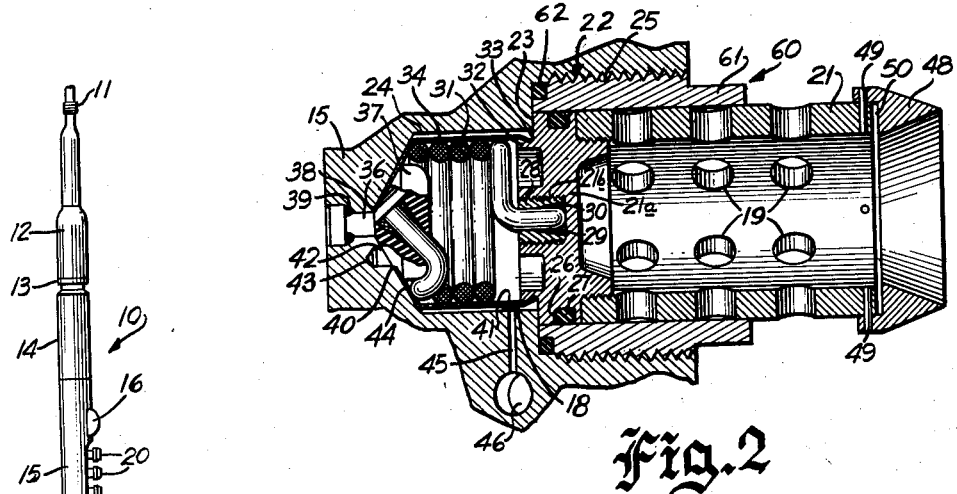
Fig.2
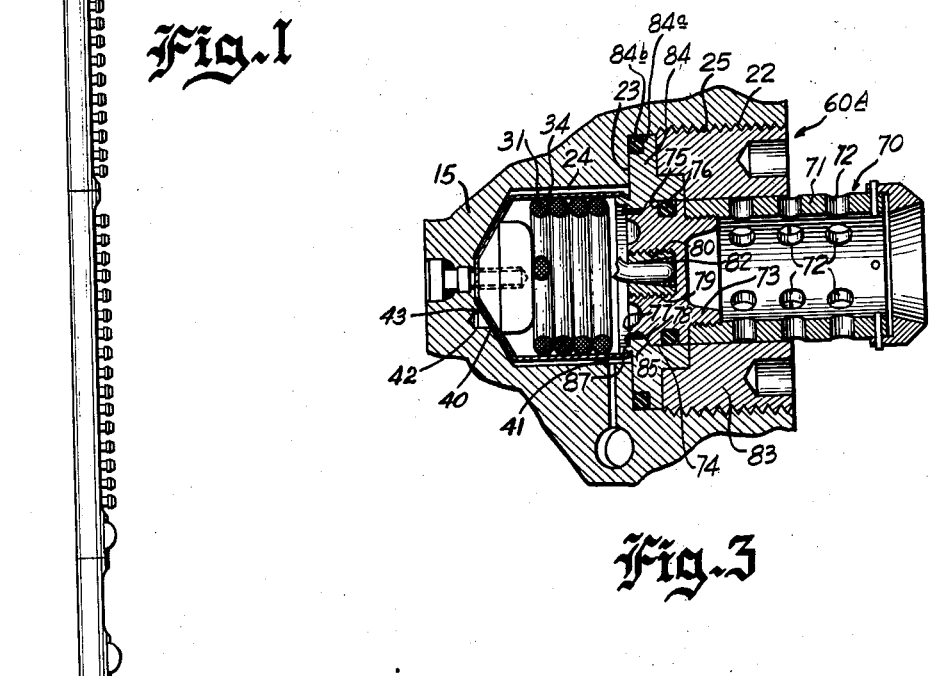
Fig.1
Fig.3
Inventor
Jake H. LeBus
by
Mason, Kolehmainen, Rathburn and Wyss.
Attorneys.

United States Patent Office 2,944,791
Patented July 12, 1960

2,944,791

SAMPLE TAKING APPARATUS

Jake H. Le Bus, Bellaire, Tex., assignor, by mesne assignments, to PGAC Development Company, Houston, Tex., a corporation of Texas Filed Feb. 7, 1956, Ser. No. 563,995

4 Claims. (Cl. 255—1.4)

The present invention relates to core taking or sample taking apparatus, and more particularly to improvements in a sample taking tool assembly wherein adapter means are provided for accommodating sample taking tools having different diameters.

As is well known in the art, sample taking guns of the type adapted to be lowered into a borehole to a predetermined level and constructed to drive a core taking projectile into the borehole wall by explosive means for obtaining a core sample have heretofore been proposed. The sample taker guns available on the market today are available in many different diameter sizes which are provided with correspondingly sized sample taking tools having one predetermined length and diameter. Clearly, the sampling of large boreholes is obtained by using large diameter guns having large diameter sampling tools. However, in sampling formations surrounding small diameter boreholes, for example, it is necessary to have a small diameter gun equipped with a small diameter core projectile. The size of the gun and tool is necessarily related because the withdrawal of the sample taker gun after a sample taking operation requires that the core projectile be carried alongside the gun thereby increasing the effective diameter of the sample taking gun. In addition, when the sample taking gun is used with formations of particular hardness or possessing particular characteristics which tend to preclude successful coring thereof, it is necessary that small diameter projectiles be employed. Moreover, it has been noted that in testing small diameter boreholes about which the formation was peculiarly hard, the small diameter guns were unable to sample properly because the size of the powder cavity of the smaller diameter sample taker gun of necessity had to be reduced in size, thereby substantially reducing the powder load of the projectile. Likewise, the retrieving flexible cable was reduced in size proportionally, thereby effecting a reduction in strength.

Accordingly, it is desirable to provide a sample taker gun having a sample taking tool assembly in which an adapter and bushing may be employed to accommodate and seat either large or small diameter hollow projectiles. Moreover, it would be advantageous to provide a single sample taker gun adaptable for use with either large or small diameter projectiles such that when using a small core projectile a relatively stronger retaining cable and a relatively large powder chamber, with capacity to hold greater powder loads than are normally provided in a sample taker gun equipped with small diameter projectiles, may be employed therewith.

It is an object of the present invention to provide a sample taking gun obviating the undesirable features of the present sample taking guns and embodying the desirable characteritsics enumerated above.

Another object of the present invention is to provide an improved sample taking gun having an improved sample taking tool assembly wherein means are provided for accommodating and seating core projectiles of different sizes.

Still another object of the present invention resides in providing a single sample taking gun having a sample taking tool assembly which embodies means for accommodating and seating core projectiles of different diameters, whereby said sample taking guns may be used in small or large boreholes in formations having either easy or difficult penetrative properties.

A further object of the present invention is to provide a sample taker gun which may be adapted to function with small core projectiles, but retaining a large-sized powder cavity for carrying much higher powder loads than permitted by the small diameter sample taker guns.

It is still a further object of the present invention to provide an improved sample taking gun tool which may be quickly and easily modified for use in a selected borehole of particular diameter, which tool may be equipped with a selected core projectile having a predetermined diameter.

Briefly, in accordance with the present invention, there is provided a sample taking gun in which there is included a sample taking tool assembly embodying adapter and bushing means for accommodating and seating selective hollow projectiles for obtaining different sized samples in the formations possessing different physical properties in boreholes of different diameters. The adapter means of the sample taking tool assembly comprises a readily replaceable and exchangeable bushing arrangement adapted to receive therein and seat a selective hollow projectile. In this manner, a single gun may be used to effect a sample operation in either large or small bore holes having surrounding formations of either high or low density.

For a more complete understanding of the invention, reference should now be had to the drawing in which:

Fig. 1 is an elevational view of a complete sample taking gun embodying the present invention;

Fig. 2 is an enlarged sectional view of the sample taking gun of Fig. 1 illustrating the sample taking tool assembly embodying one arrangement of the bushing means of the present invention; and Fig. 3 is an enlarged sectional view of the sample taking gun illustrating the sample taking tool assembly embodying another arrangement of the bushing means of the present invention.

Referring now to the drawing, and in particular to Fig. 1, there is illustrated the sample taking gun, designated as 10, which is disclosed and described in detail in a copending application, Serial No. 313,181, filed October 4, 1952, in the name of Jacques H. Castel, and assigned to the same assignee as the present invention. Briefly, the gun 10 is suspended from the conventional armored cable 11, the lower end of which is connected through a cable head 12 and an adapter 13 to the upper end of the controller housing 14, to which is connected an upper gun block 15. The gun block 15 is provided adjacent its upper end with a suitable bumper 16, preferably formed of soft metal, and carries a plurality of sample taking tool assemblies 20 disposed in suitable transverse bores 22 (shown in Figs. 2 and 3) formed in the gun block, which bores are of stepped construction to provide an annular shoulder 23 surrounding a rear or inner explosion chamber 24 and defining a rear wall for a forward or outer chamber 25.

Referring now to Fig. 2, the invention is illustrated as embodied in a sample taking tool assembly of the type described in the above referred to pending application. Briefly, the sample taking tool assembly consists of a hollow tubular barrel 21 disposed within a bushing 61 which is, in turn, disposed within the forward chamber 25 of the bore 22. The tubular barrel 21 has defined in the sidewalls thereof a plurality of apertures 19 for permitting the outward flow of liquid or mud from the barrel when the projectile is forced into the sidewall of the earth formation during a sampling operation.

Threadedly secured to the rear end of the barrel 21 is a plug or closure member 21a having an annular groove 26 formed in the outer surface thereof for receiving an O ring 27 which provides a seal between the bushing means hereinafter described and the core projectile which is formed by the barrel 21 and the plug 21a. As shown, the plug 21a is also provided with a centrally threaded aperture 21b for receiving a threaded securing member 28 having a tapered opening 29 therein for receiving a wedge 30 that is brazed or otherwise suitable secured to one end of the projectile retrieving cable 31. After the cable has been pulled through the tapered aperture 29 to the point where the wedge 30 is engaged in its aperture, the securing member 28 may be threaded into the plug 21a permanently to secure the cable 31 to the plug.

The rear wall of the plug 21a is also provided with an annular flange 32 having an annular indentation 33 into which is pressed a portion of an explosive receiving container 34 which may be formed of any suitable material of relatively light gauge, which receiving container 34 is conformably seated into the explosion chamber 24 of the bore 22. The rear wall of the explosive receiving container 34 is tapered to engage the innermost surface of the chamber 24, and this rear wall is provided with a centrally disposed aperture 36. The retrieving cable 31 is adapted to be coiled within the cuplike container 34, and the rear end of the cable 31 is secured by means of another wedge-type connection to a cable retaining member 37, the rear wall of which is tapered to engage the tapered rear wall of the container 34. The cable retaining member 37 is threaded to receive a retaining screw 38 which may be inserted into the rear of a transverse bore 22, and which, when tightened, will permanently secure the cable retaining member 37 in the bore 22. A suitable O ring 39 is employed to provide a suitable seal between the securing screw 38 and the rear portion of the transverse bore 22 through which the securing screw extends.

As shown, the cup-shaped container 34 is provided with a pair of apertures 40 and 41, respectively disposed in the bottom and side walls of the container, the aperture 40 being adapted to receive a positioning pin 42 which is formed on the retaining member 37 and extends into a suitably positioned hole 43 drilled into the wall of the chamber 24 and which functions to position the aperture 41 in alignment with the passageway 45 leading from a detonating chamber 46.

After the charge receiving container and the cable retaining member have been assembled on the plug 21a, the container 34 may be filled with a suitable powder charge and a small piece of frangible material such as adhesive tape 18 may be placed over the aperture 41 as shown in Fig. 2 to retain the powder in the container 34 until the assembly has been positioned in the block. This frangible covering, while preventing spilling of the powder charge, will not prevent the passage of hot gases from the detonating chamber through the passageway 45 into the explosive container 34 to effect ignition of the main charge.

In addition to the above-described elements which may be pre-assembled and quickly installed in the gun blocks, the sample taking tool assembly further includes a cutting ring 48 which is carried on the outer end of the barrel 21 and secured in position thereupon by a plurality of shear pins 49. The cutting ring 48 is provided with an annular shoulder 50 which is directly in front of, but in spaced relation to the front end of the barrel 21, and the shear pins are assembled in aligned apertures in the barrel in the cutting ring.

In accordance with the present invention bushing means are provided as shown in Figs. 2 and 3, in which different projectile and bushing arrangements are shown to facilitate the use of large or small core projectiles.

Referring to Fig. 2, the bushing means 60 comprises an annular bushing 61 having its external surface threaded for engagement with the internally threaded surface of the forward chamber 25 of the bore 22. The internal diameter of the bushing 61 is of such diameter as to accommodate or receive a large core projectile including the barrel 21 and plug 21a, and it will be noted that the bushing 61 extends throughout the length of the projectile chamber 25 and abuttingly engages the shoulder 23, which is also engaged by portion 21a of the projectile. Formed in the surface of the innermost corner of the bushing 61 is an annular groove adapted to receive an O ring 62 for providing a seal between the bore 22 and the bushing 61.

In order to sample the formations of a borehole having a small diameter without using a second sample taker gun, the adapter and bushing arrangement 60A illustrated in Fig. 3 may be substituted for the bushing means 60 shown in Fig. 2. It will be appreciated that a smaller barrel assembly is required to be used in those boreholes containing smaller diameters and also in those boreholes in which the formations adjacent the borehole walls possess such physical properties as to prevent facile coring thereof.

To this end, small diameter core projectile assemblies are used with the sample taker gun which include the adapter and bushing arrangement shown in Fig. 3. This core projectile 70 comprises a somewhat smaller barrel 71 than the barrel 21 of the large projectile assembly shown in Fig. 2, but, similarly to the barrel 21, it has defined therein a plurality of apertures 72 which permit the passage of borehole fluids when the barrel 71 is driven into the wall of a borehole during a sampling operation. Threadedly engaged within the rear end of the barrel 71 is a plug 73 having a configuration to provide a continuous rearward extension 74 for the barrel 71. Defined on the surface of this extension 74 is an annular groove 75 in which is located an O ring 76 for effecting a seal between the core projectile 70 and an adapter ring 84 which, as hereinafter described, forms a part of the projectile assembly. The innermost end of the plug 73 is cut away to provide an annular flange 77 of lesser diameter extending rearwardly from an annular seating shoulder 78. The plug 73, similar to the plug 21a of Fig. 2, is also provided with a centrally threaded aperture 79 for receiving a threaded securing member 80 having a tapered opening therein for receiving a wedge 82 that is brazed or otherwise secured to one end of a projectile retrieving cable 31.

In order properly to accommodate and seat the projectile assembly of Fig. 3, including the small diameter core barrel 71 in the same bore 22 as the assembly including the larger core barrel 21 of Fig. 2, a thick annular bushing 83 is provided having its external surface threaded for engagement with the bore 22 of the block 15, and, as shown in Fig. 3, the bushing 83 extends into the chamber 25 of the bore 22 a sufficient distance to engage the front surface of an adapter ring 84 and firmly seat this adapter ring on the shoulder 23, a suitable groove 84a and an O ring 84b being provided, as shown, for sealing purposes. The adapter ring 84, which forms a part of the projectile assembly, has a central opening of sufficient diameter to receive the plug 73 which is secured to the core barrel 71, and this central opening is provided with a tapered seat 85 adapted to engage the seating shoulder 78 on the plug 73 so as to support the core projectile against hydrostatic pressures encountered within the borehole. The fit between the adapter ring 84 and the plug 73 is sufficiently snug to maintain the two parts in assembled relation during normal handing operations, but at the same time will permit ejection of the core barrel 71 and the plug 73 as a unit through the bushing 83 under the force of an explosion.

As shown, the rear surface of the adapter ring 84 is provided with an annular extension 87 having a tapered outer wall over which the forward end of an explosive container 34 may be pressed, as explained in connection with the structure of Fig. 2, the arrangement of the explosive container 34 and the retrieving cable 21 being identical with the corresponding elements described in connection with Fig. 2.

In the embodiment illustrated in Fig. 3, the adapter ring 84 which supports the explosive container 34 will not separate from the explosive container when the charge is fired, but will instead be held firmly in position by the bushing 83 while the sample taking projectile which comprises the core barrel 71 and the plug 73 will be projected outwardly through the bushing 83 and into the formations surrounding the borehole.

It will now be apparent that the sample taking tool may be utilized with either a small or a large core barrel. Manifestly, only one sample taker gun is employed, which, by virtue of the adapter and bushing means, is enabled to sample borehole wall formations in either large diameter or small diameter boreholes, and, in addition, is enabled to take either large or small samples. Moreover, the effective diameter of the sample taking gun is varied by the selection of either the large or small core barrels and associated adapter and bushing means, inasmuch as the effective diameter of the gun is altered or determined by the diameter of the core barrels suspended from the retrieving cable alongside the gun during withdrawal of the gun from the borehole.

It will be appreciated that by use of the adapter means the explosion chamber is not reduced and, hence, the powder load is not lessened when operating the sample taking gun with the small barrel core. Accordingly, a much larger and stronger retaining cable may be used and at the same time a powder chamber may be employed having a larger capacity than normally provided with a sample taker equipped with the small type core barrels.

It will readily be understood that the adapter and bushing means may quickly and easily be removed from or assembled in the transverse bores 22 of the sample taker gun so as quickly to adapt the gun for use with either the large or small core barrels as required for a particular operation.

While a particular embodiment of the invention has been shown, it will be understood, of course, that the invention is not limited thereto, since many modifications may be made, and it is, therefore, contemplated by the appended claims to cover any such modifications as fall within the true spirit and scope of the invention.

What is claimed as new and desired to be secured by United States Letters Patent is:

1. In a sample taking gun for use in a borehole, a body portion having a transverse bore the diameter of which decreases in at least one step to define an outwardly facing shoulder at the boundary between an outer projectile receiving chamber and an inner explosive receiving chamber, said projectile receiving chamber including a threaded side wall chamber of greater diameter than the projectile to be received therein, an explosive container housing an explosive charge and located within said explosive receiving chamber, said explosive container having an opening in the rear portion thereof, a hollow sample taking core projectile located within said projectile receiving chamber, a retrieving cable stored within said explosive container, means extending through said opening in said explosive container for securing one end of said retrieving cable to said body portion, means connecting the other end of said retrieving cable to said core projectile, said core projectile being movable relative to said explosive container upon explosion of the charge in said container, bushing means surrounding said core projectile and including a portion externally threaded for cooperation with said threaded side wall to support said core projectile in said projectile receiving chamber and to guide the core projectile upon expulsion from said projectile chamber, and means including said shoulder and said bushing means for supporting said core projectile in sealed relation against the hydrostatic pressure in said borehole.

2. In a sample taking gun for use in a borehole, a body portion having a transverse bore the diameter of which decreases in at least one step to provide an outwardly facing shoulder which defines the boundary between an outer projectile receiving chamber and an inner explosive receiving chamber, said projectile receiving chamber including a side wall portion of substantially greater diameter than the projectile to be received therein, a projectile assembly including a small diameter sample taking projectile positioned in said projectile receiving chamber, a larger diameter adapter ring surrounding a rear portion of said sample taking projectile, bushing means surrounding said projectile and including a portion for cooperation with substantially the entire length of the side wall portion of said projectile receiving chamber to support said projectile in said bore, said adapter ring being held against said outwardly facing shoulder by said bushing means and having an internal outwardly facing shoulder engaging the inner end of said sample taking projectile, and a retrieving cable stored in said inner explosive receiving chamber and connected between said projectile and said body portion.

3. In a sample taking gun as claimed in claim 1, in which the bushing means is a unitary structure having a wall thickness which approximates the thickness of the sidewall of the core projectile.

4. In a sample taking gun as claimed in claim 1, in which the bushing means includes an an annular bushing having a wall thickness which is substantially greater than the thickness of the sidewall of the core projectile.

References Cited in the file of this patent

UNITED STATES PATENTS

| 2,055,560 | Schlumberger | Sept. 20, 1936 |
| 2,092,294 | Turecher | Sept. 7, 1937 |
| 2,313,369 | Spencer | Mar. 9, 1943 |
| 2,408,419 | Foster | Oct. 1, 1946 |
| 2,426,335 | Banning | Aug. 26, 1947 |
| 2,509,608 | Penfield | May 30, 1950 |
| 2,799,474 | Schneersohn | July 16, 1957 |
| 2,848,194 | Porter | Aug. 19, 1958 |

FOREIGN PATENTS

| 513,957 | Canada | June 21, 1955 |